June 4, 1957 — L. E. CLIFTON — 2,794,612
PORTABLE CAMERA STAND
Filed March 29, 1954
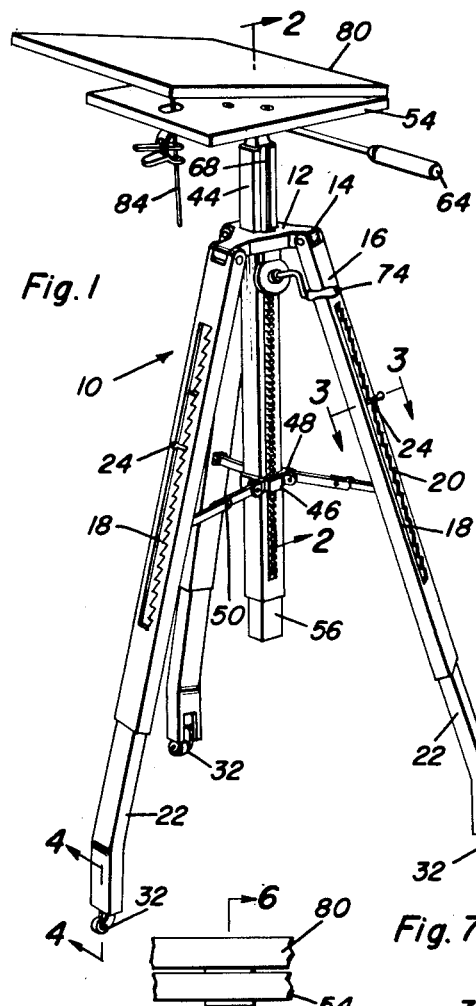
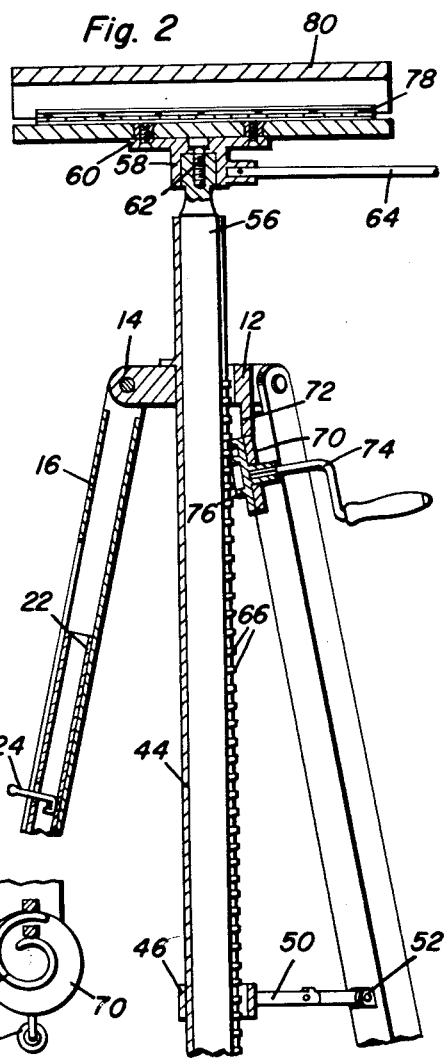
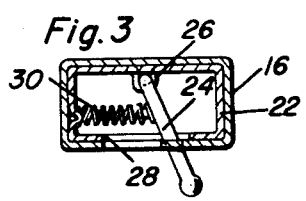
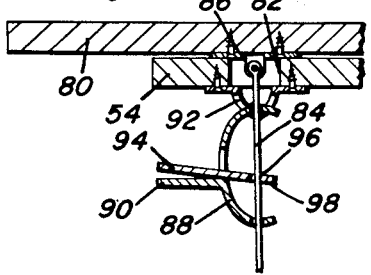
Leyman Ernest Clifton
INVENTOR.

United States Patent Office

2,794,612
PORTABLE CAMERA STAND
Leyman Ernest Clifton, Marietta, Ga.

Application March 29, 1954, Serial No. 419,164

1 Claim. (Cl. 248—161)

This invention relates to a portable camera stand and more specifically provides a universally adjustable and easily collapsed camera stand for supporting a camera while focusing and taking a picture.

An object of this invention is to provide a portable camera stand which is simple in construction, versatile in utility, universal in adjustability, easy to position, well adapted for its purposes and relatively inexpensive to manufacture.

Another object of this invention is to provide a portable camera stand having a plurality of adjusting means for universally adjusting the camera engaging member for positioning the camera as desired.

Yet another object of this invention is to provide a portable camera stand which is foldable and includes retracting casters on the bottoms of the supporting legs wherein the device may be rolled over a floor or other surface with the casters in extended position or supported in a stationary manner with the casters in retracted position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the portable camera stand of the present invention;

Figure 2 is a vertical section taken substantially along section line 2—2 of Figure 1 showing the details of construction of the centrally disposed sleeve and the rod sliding therein;

Figure 3 is a transverse top plan section taken substantially along section line 3—3 showing the details of construction of the telescopically adjustable legs;

Figure 4 is a detail section taken substantially along section line 4—4 of Figure 1 showing the details of construction of the retractible caster;

Figure 5 is an end view showing the details of construction of the adjusting means for adjusting the camera engaging member;

Figure 6 is a detailed section taken substantially along section line 6—6 of Figure 5 showing the details of construction of the friction means for retaining the camera engaging member in adjusted position, and Figure 7 is an elevation showing a detail of the rod adjusting device.

Referring now specifically to the drawings, it will be seen that the portable camera stand is generally indicated by the numeral 10 and includes a head 12 having three equally spaced projecting ears 14 thereon for pivotally receiving a depending tubular leg 16 which is generally polygonal in cross-sectional shape and including an elongated slot 18 having a plurality of downwardly opening notches 20 along one side of the slot 18. A telescopically received leg member 22 is inserted into the open end of the upper leg member 16 and includes a pivotally mounted latch member 24 secured to a pivot lug 26 on the rear of the extending leg 22 and projecting through a slot 28 for engagement with selected notches 20. A compression coil spring 30 is provided for urging the latch 24 into engagement with the notches 20 in the slot 18. By manipulating the latch 24, the links of the supporting legs 16 may be easily adjusted as desired. As will be seen in Figure 4, the lower end of each of the outer leg members 22 is provided with a caster wheel 32 having the usual supporting bracket 34 pivoted on a vertical axis 36. The vertical axis 36 is secured to a bracket member 38 having a pivot pin 40 mounting the bracket 38 to the lower end of the leg 22. A suitable detent 42 is provided for retaining the caster 32 in its normal position. However, the spring detent may be overcome wherein the caster 32 may be raised to a position substantially shown in phantom in Figure 4, and the spring detent 42 may engage another indentation so arranged in order to retain the caster wheel 32 in retracted position.

It will be seen that the head 12 is provided with a centrally disposed tubular sleeve 44 which extends slightly above and extensively below the head 12 for a purpose described hereinafter. Adjacent the lower end of the sleeve 44 is provided a surrounding ring 46 having pivot ears 48 thereon for receiving one end of a pivotally foldable brace 50 that is pivotally secured at its other end to a pivot lug 52 secured to the leg members 16. It will be seen that by manipulation of the folding braces 50, the legs 16 may be retained in an extended position substantially as shown in Figure 1, or collapsed to a position substantially parallel and alongside the centrally disposed tube 44 for ease of portability of the camera stand 10.

A supporting plate 54 is provided with a depending centrally disposed pin or rod 56 that is slidably received in the centrally disposed sleeve 44 and substantially the same shape. The pin 56 is journaled in a socket 58 secured to the undersurface of the plate 54 by suitable fastening means 60, and a bolt 62 is provided for rotatably journaling the upper end of the pin 56 to the bracket 60. A suitable handle 64 is secured to the bracket 60 at one side thereof for manipulating the supporting plate 54 about a vertical axis formed by the bolt 62. A plurality of spaced projections or teeth 66 are provided along one side of the depending pin 56 and these teeth 66 form a rack which projects through an elongated slot 68 in the tubular sleeve 44, and the teeth 66 are engaged by a lifting member 70 rotatably journaled in a depending bracket 72 and provided with a detachable crank 74 for raising and lowering the depending pin 56. The raising and lowering member 70 includes a pair of spiral members 76 secured to the face of the lifting member 70 and in engagement with the teeth 66 wherein the handle 74 may be used to rotate the spiral projections 76 for raising and lowering the depending pin 56. The spirals 76 overlap each other so that a continual raising and lowering force will be exerted on the pin 56.

Pivotally secured to one edge of the supporting plate 54 by a suitable hinge 78 is a camera engaging member 80. At the edge of the supporting plate 54 remote from the hinge 78 is provided a suitable aperture 82 for pivotally receiving a pivotal pin 84 secured to the undersurface of the camera engaging member 80 by a suitable bracket 86. The pivotal pin 84 passes through the legs of a U-shaped member 88 having a projecting handle 90 thereon. It will be seen that the leg portions of the U-shaped member 88 form a vertical guide for the pin 84 and the U-shaped member 88 is secured to the undersurface of the supporting plate 54 by a suitable bracket 92 and a binding lever 94 having an enlarged aperture 96 in one end which surrounds the pin 84 is fulcrumed at 98 wherein the edges of the aperture 96 will bite into or bind the depending pin or rod 84 when the lever 94 is moved from a horizontal position. Obviously, the lever 94 may be urged flat against the handle portion 90 of the U-shaped member 88, thereby permitting movement of the camera engaging plate 80.

The operation of the device will be readily understood. The legs 16 are extended by utilizing the folding braces 50 for retaining the legs 16 in correct angular relation and by utilizing the latches 24 for extending the legs into the correct length. The crank handle 74 is manipulated for adjusting the vertical height of the supporting plate 54 and the angular relation of the camera engaging plate 80 is adjusted by manipulating the lever 94 in an obvious manner. The plate 54 and the camera engaging member 80 may be adjusted about a vertical axis formed by the bolt 62 as desired. If necessary, the casters 32 may be retracted substantially as shown in Figure 4 for providing a solid stationary camera support.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A portable foldable stand comprising a horizontally disposed head with radially extending ears disposed thereon, a plurality of longitudinally adjustable legs pivotally attached to said ears, a centrally disposed polygonal tubular member extending through and rigid with said head, a plurality of collapsible braces interconnecting the tubular member and the legs in spaced relation to the head for providing a rigid supporting structure, said tubular member having an elongated slot therein communicating with the upper end thereof, said head having a notch therein in alignment with said slot, an elongated polygonal rod slidably disposed in said tubular member, a supporting plate disposed horizontally on the upper end of said rod, said plate being adjustable about a vertical axis, said rod having a plurality of longitudinally spaced and aligned projecting teeth thereon, said teeth projecting through said slot and received in said notch in the head, a depending bracket mounted on said head, a rotatable plate mounted on said bracket in facing relation to the teeth, said plate having a spiral projection on the face thereof disposed in meshing relation with the teeth, and a handle on said plate for rotating the same for raising and lowering the supporting plate and rod.

References Cited in the file of this patent
UNITED STATES PATENTS

| | | |
|---|---|---|
| 390,199 | Blackmore | Oct. 2, 1888 |
| 633,284 | Heitmann | Sept. 19, 1899 |
| 709,612 | Smith | Sept. 23, 1902 |
| 836,959 | Bushard | Nov. 27, 1906 |
| 1,245,400 | Tomlinson | Nov. 6, 1917 |
| 1,573,496 | Jansson | Feb. 16, 1926 |
| 2,277,939 | Thalhammer | May 31, 1942 |
| 2,446,518 | Arnold | Aug. 10, 1948 |
| 2,459,040 | Miller | Jan. 11, 1949 |
| 2,484,982 | Coutant | Oct. 18, 1949 |
| 2,553,890 | Bloch | May 22, 1951 |

FOREIGN PATENTS

| | | |
|---|---|---|
| 978,162 | France | Apr. 10, 1951 |